United States Patent
Lueng et al.

(10) Patent No.: US 8,634,157 B2
(45) Date of Patent: Jan. 21, 2014

(54) CLOSE LOOP METHOD FOR MEASURING HEAD SNR AND MEDIA SNR

(75) Inventors: Chiuming Lueng, Hong Kong (CN); Mankit Lee, Hong Kong (CN); Wanyin Kwan, Hong Kong (CN); Cheukwing Leung, Hong Kong (CN); Juren Ding, Hong Kong (CN); Rongkwang Ni, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 438 days.

(21) Appl. No.: 13/067,163

(22) Filed: May 12, 2011

(65) Prior Publication Data

US 2012/0287529 A1    Nov. 15, 2012

(51) Int. Cl.
*G11B 21/12* (2006.01)
*G11B 20/10* (2006.01)

(52) U.S. Cl.
USPC ............................................. 360/75

(58) Field of Classification Search
None
See application file for complete search history.

(56) References Cited

U.S. PATENT DOCUMENTS 5,889,784 A * 3/1999 Rogers ................. 714/704

* cited by examiner

*Primary Examiner* — K. Wong
(74) *Attorney, Agent, or Firm* — Nixon & Vanderhye PC

(57) ABSTRACT

A close loop method for measuring head SNR, for a storage device comprising a storage media and a head, comprising steps of: (a) loading the head on the media with a dynamic fly height; (b) measuring an initial environmental temperature value T1 and measuring the head signal $signal_{load}$; (c) unloading the head; (d) adjusting a power which controls the dynamic fly height until a real-time environmental temperature value T2 is equal to the initial environmental temperature T1; (e) measuring the head noise value $noise_{unload}$; (f) calculating the head SNR with the follow equation:

$$\text{Head\_SNR} = 20 \times \log\left(\frac{signal_{load}}{noise_{unload}}\right).$$

The method of the present invention can obtain a fair condition between the signal and noise measurement, thereby a reliable and accurate head SNR can be obtain. The present invention also provides a close loop method for measuring media SNR.

14 Claims, 4 Drawing Sheets

CLOSE LOOP METHOD FOR MEASURING HEAD SNR AND MEDIA SNR

FIELD OF THE INVENTION

The present invention relates to methods for testing the performance of storage devices such as disk drives, and more particularly to a close loop method for measuring head SNR (signal to noise ratio) and media SNR.

BACKGROUND OF THE INVENTION

Disk drives are information storage devices that use magnetic media to store data and a movable read/write transducer positioned over the magnetic media to selectively read data from and write data to the magnetic media.

To pursue more accurate reading and writing performance, disk drive manufacturers have continued to develop higher capacity disk drives by, for example, increasing the recording and reproducing density of the information tracks on the disks by using a narrower track width and/or a narrower track pitch. As track density increases, it becomes more and more difficult to quickly and accurately position the read/write transducer over the desired information tracks on the disk. One approach that has been effectively used by disk drive manufacturers to improve the positional control of read/write heads for higher density disks is to employ a voice coil motor (VCM). Referring to FIG. 1, a conventional disk drive device using VCM typically has a drive arm 104, a head gimbla assembly (HGA) 106 attached to and mounted on the drive arm 104, a stack of magnetic disks 101 suspending the HGA 106, and a spindle motor 102 for spinning the disks 101. The employed VCM is denoted by reference number 105 and is connected to the drive arm 104 for controlling the motion of the drive arm 104 and, in turn, controlling a slider 103 to position with reference to data tracks across the surface of the magnetic disk 101, thereby enabling the read/write head imbedded in the slider 103 to read data from or write data to the disk 101. Presently, tunnel magneto resistive (TMR) sensor, commonly referred to as TMR sensor, is the prevailing read sensor because of its better capability to read data from media (surface of a disk) at greater track and linear densities than other magneto resistive heads.

There are kinds of characteristics test to measure the quality of a disk drive. SNR is a key parameter for disk drive testing, as it can have good correction with bite error rate, BER. However, total SNR of a disk drive usually includes both "writing" and "reading" effect. In order to have different "writing" and "reading" effect, for the better characterization, two more SNR were proposed:

$$(Total\_SNR)^2 = (Media\_SNR)^2 + (Head\_SNR)^2$$

Concretely, for a storage device comprising a storage media and a head for writing to and/or reading data from the media, the total SNR includes "writing" and "reading" effect, both signal and noise measured under the condition of the head loading on the media with a dynamic fly height (DFH). The head SNR mainly includes read part only, with signal is measured under loading the head and noise is measured by unloading case. And media SNR includes writing effect and media transition related which calculated through below equation:

$$Media\_SNR = \sqrt{(Total\_SNR)^2 - (head\_SNR)^2}$$

In magnetic recording disk drives, where the magnetic recording media on the disks is a granular metal alloy, such as a CoPt alloy, the intrinsic media noise increases with increasing linear recording density. Media noise arises from irregularities in the recorded magnetic transitions and results in random shifts of the read back signal peaks. Higher media noise leads to higher bit error rates. Thus to obtain higher areal densities in magnetic recording disk drives, it is necessary to decrease the intrinsic media noise, i.e., increase the SNR of the recording media. Thereby accurate head SNR is needed for estimating media SNR.

A tradition method for measuring head SNR is using DP (dynamic performance) signal (load on media) while noise value measured by unload condition: both are under "DFH power on", wherein the DFH power is applying for controlling the DFH. However. However it will under estimate head SNR value because the measuring condition of the head unloading with DFH power on, thereby the environmental temperature during noise measurement will be much higher than the actual case, noise value will become much higher as well.

Hence, it is desired to provide a close loop method to improve head SNR measurement and media SNR measurement accuracy.

SUMMARY OF THE INVENTION

One objective of the present invention is to provide a close loop method for measuring head SNR for a storage device. It can make fair condition between signal and noise measurement, thereby improving the measurement accuracy for the head SNR.

Another objective of the present invention is to provide a close loop method for measuring media SNR for a storage device. It can make fair condition between signal and noise measurement, thereby improving the measurement accuracy for the head SNR.

To achieve the first objective, the present invention first provides a close loop method for measuring head SNR, for a storage device comprising a storage media and a head, the method comprising the steps of: (a) loading the head on the media with a dynamic fly height; (b) measuring an initial environmental temperature value T1 and measuring the head signal $signal_{load}$; (c) unloading the head; (d) adjusting a power which controls the dynamic fly height until a real-time environmental temperature value T2 is equal to the initial environmental temperature T1; (e) measuring the head noise value $noise_{unload}$; (f) calculating the head SNR with the follow equation:

$$Head\_SNR = 20 \times \log\left(\frac{signal_{load}}{noise_{unload}}\right).$$

Preferably, the environmental temperature is detected by a temperature sensor which is embedded into the head, and the environmental temperature is indicated by a temperature sensor resistance.

Preferably, the step (b) is measuring an initial temperature sensor's resistance value TSR1. And corresponding to this step (b), step (d) turns to be adjusting the power which controls the dynamic fly height until the real-time temperature sensor's resistance value TSR2 is equal to the initial temperature sensor's resistance TSR1.

Preferably, the step (d) comprises the steps of: (d1) gradually adding the power which controls the dynamic fly height; (d2) measuring T2 under corresponding DFH power; (d3) judging whether T2=T1, if NO, performing steps (d1)-(d2), if YES, going to step (e). And more preferably, the power for controlling the dynamic fly height is gradually adding from zero.

To achieve another objective, the present invention also provides a close loop method for measuring media SNR, for a storage device comprising a storage media and a head, the method comprising the steps of: (a) loading the head on the media with a dynamic fly height; (b) measuring an initial environmental temperature T1 and measuring the head signal signal$_{load}$; (c) unloading the head; (d) adjusting a power which controls the dynamic fly height until a real-time environmental temperature T2 is equal to the initial environmental temperature T1; (e) measuring the head noise value noise$_{load}$; (f) calculating the Head SNR with the follow equation:

$$\text{Head\_SNR} = 20 \times \log\left(\frac{\text{signal}_{load}}{\text{noise}_{unload}}\right);$$

(g) calculating the media SNR with the follow equation:

$$\text{Media\_SNR} = \sqrt{(\text{Total\_SNR})^2 - (\text{Head\_SNR})^2}.$$

Preferably, the step (b) further comprises the step of measuring the noise value noise$_{load}$, the total SNR is calculated with the follow equation:

$$\text{Total\_SNR} = 20 \times \log\left(\frac{\text{signal}_{load}}{\text{noise}_{load}}\right).$$

Preferably, the environmental temperature is detected by a temperature sensor which is embedded into the head, and the environmental temperature is indicated by a temperature sensor resistance.

Preferably, the step (b) is measuring an initial temperature sensor's resistance TSR1. And corresponding to this step (b), step (d) turns to be adjusting the power which controls the dynamic fly height until the real-time temperature sensor's resistance TSR2 is equal to the initial temperature sensor's resistance TSR1.

Preferably, the step (d) comprises the steps of: (d1) gradually adding the power which controls the dynamic fly height; (d2) measuring T2 under corresponding DFH power; (d3) judging whether T2=T1, if NO, performing steps (d1)-(d2), if YES, going to step (e). And more preferably, the power for controlling the dynamic fly height is gradually adding from zero.

In comparison with the prior art, the present invention provides a close loop method for measuring head SNR with higher accuracy by making a fair condition for signal and the noise measurement. The head SNR is calculated through below equation:

$$\text{Head\_SNR} = 20 \times \log\left(\frac{\text{signal}_{load}}{\text{noise}_{unload}}\right),$$

here the signal measurement is under the condition that the head is loading on the media with a fly height, while the noise is measured by unload condition, both signal and noise measurement are under the condition that a DFH power is applied. However, the environmental temperature is much hotter during the head unload when the DFH power still applying, affecting the noise value noise$_{unload}$ become over-estimated. Therefore the present method tries to "control" the temperature during unload noise measurement that close to actual case. An initial environmental temperature T1 is measured for comparison when head signal signal$_{load}$ measured, then the DFH power is adjusting during unload case to affect the real-time environmental temperature until the correspond environmental temperature T2=T1, thereby the noise measurement can be carried out with fair condition, and a reliable and accurate head SNR can be obtained. Furthermore a reliable and accurate media SNR also can be obtained.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
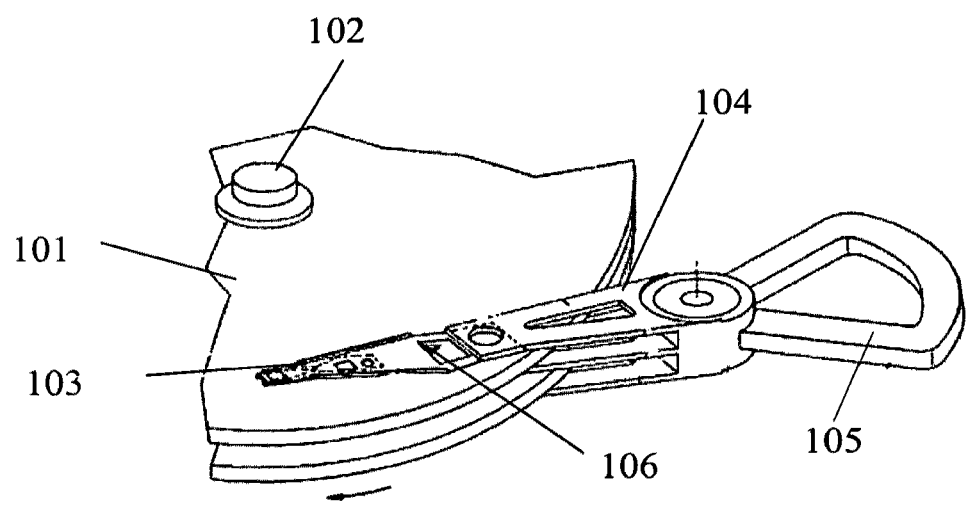
FIG. 1 shows a typical storage drive structure with a storage media and a head for writing to and/or reading data from the media according to a prior art.

Various preferred embodiments of the invention will now be described with reference to the figures, wherein like reference numerals designate similar parts throughout the various views. As indicated above, for a storage device comprising a storage media and a head for writing to and/or reading data from the media, the invention is directed to a close loop method for measuring head SNR, it tries to "control" the environmental temperature during unload noise measurement that close to actual case. An initial environmental temperature T1 is measured for comparison when head signal signal$_{load}$ measuring, then the DFH power is adjusting during unload case to affect the real-time environmental temperature until the real-time environmental temperature T2 is equal to the initial environmental temperature T1, thereby the noise measurement can be carried out with fair condition, and a reliable and accurate head SNR can be obtained. Furthermore a reliable and accurate media SNR also can be estimated by the accurate head SNR.

Figure 2:
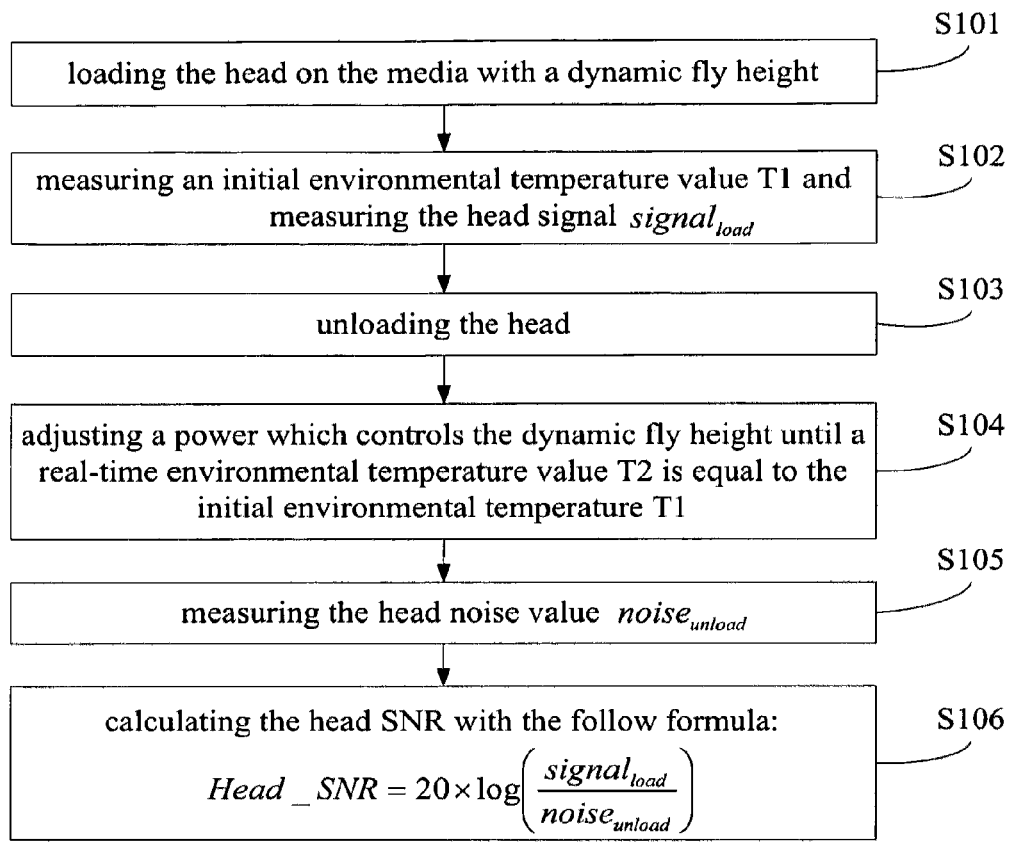
FIG. 2 is a flowchart showing a close loop method for measuring head SNR according to an embodiment of the present invention.

Referring to FIG. 2, as illustrating, a close loop method for measuring head SNR according to the present invention comprising the steps of: loading the head on the media with a dynamic fly height (step S101); measuring an initial environmental temperature value T1 and measuring the head signal signal$_{load}$ (step S102); unloading the head (step S103); adjusting a power which controls the dynamic fly height until a real-time environmental temperature value T2 is equal to the initial environmental temperature T1(step S104); measuring the head noise value noise$_{unload}$ (step S105); calculating the head SNR with the follow equation (step S106):

$$\text{Head\_SNR} = 20 \times \log\left(\frac{\text{signal}_{load}}{\text{noise}_{unload}}\right).$$

Concretely, the environmental temperature in step (S102) is detected by a temperature sensor which is embedded into the head, and the environmental temperature is indicated by a temperature sensor resistance. The temperature sensor is additional built-in on the head, especially closed to the TMR sensor, which is different from the TMR sensor. Therefore a real-time environmental temperature can be obtained. Preferably, the step (S102) is measuring an initial temperature sensor's resistance value TSR1 instead of the initial environmental temperature T1 for easy comparison. Accordingly, the step (S104) turns to be adjusting the power which controls the dynamic fly height until the real-time temperature sensor's resistance value TSR2 is equal to the initial temperature sensor's resistance TSR1.

Figure 3:
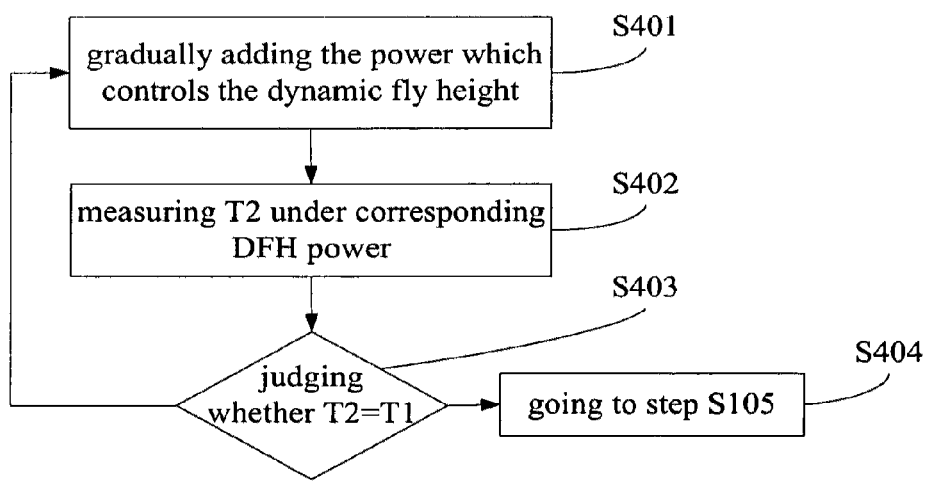
FIG. 3 is a sub-flowchart showing the step (S104) of the method in FIG. 2.

The DFH power in step (S104) is adjusted to affect the real-time environmental temperature. When the head load on the media, a DFH power is applied to enable the head floating on the media surface with a fly height. However, the DFH power likes a heater that make the environmental temperature much hotter during unload condition, which makes the noise measurement condition unfair. So temperature controlling during noise measurement (unload) is needed. Preferably, referring to FIG. 3, the step (S104) further comprises the steps of: gradually adding the power which controls the dynamic fly height (step S401); measuring T2 under corresponding power (step S402); judging whether T2=T1 (step S403), if NO, performing step (S401) and step (S402), if YES, going to step (S105). With the implement of the temperature sensor, a real-time change of temperature sensor's resistance can be obtained to indicate the change of the environmental temperature. When TRS2=TSR1, the actual environmental temperature T2 is equal to the initial environmental temperature T1. With this judging process, a close loop adjusting method will be achieved, and insuring that a fair condition can be obtain.

Figure 4:
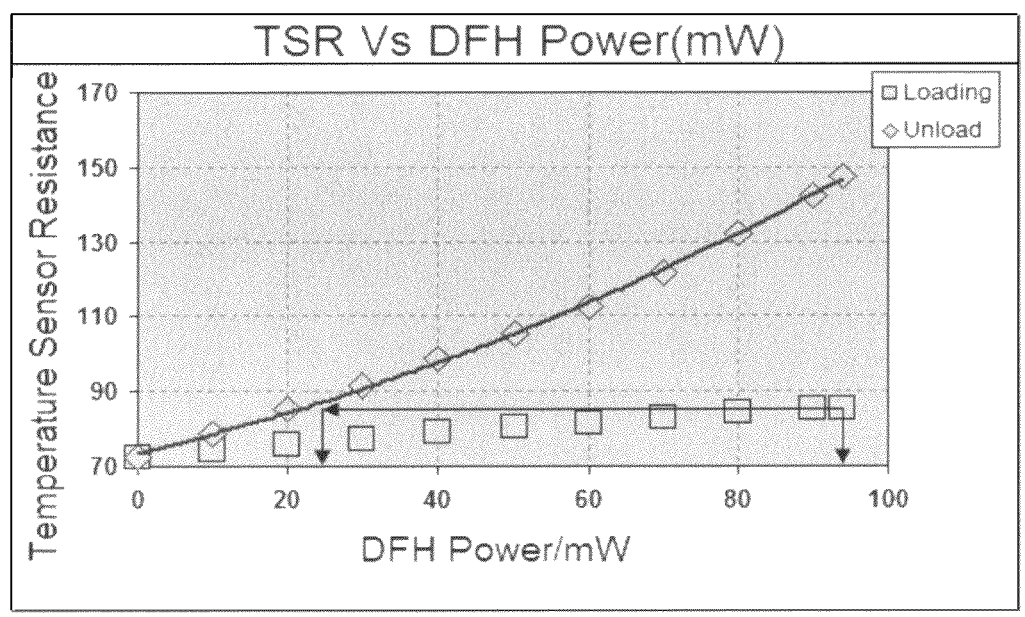
FIG. 4 is a graph showing the correlation between the temperature sensor resistance and the DFH power.

FIG. 4 is a graph showing the correlation between the temperature sensor resistance and the DFH power with the initial fly height of 1.5 nm when head loading. The initial fly height can be adjusted in an appropriate value according to the real-time need, that is to say, the initial fly height has no affection to the method to improve the measurement accuracy. Referring to FIG. 4, the temperature sensor's resistance is plotted under different DFH power in load/unload condition. By gradually adding the DFH power from zero, when the DFH power reaches to 24 mW, the correspond TSR2 is equal to the value TSR1 measured before, that is, with this DFH power adjustment and unload case conditions, the real-time environmental temperature T2 is roughly got similar with the environmental temperature T1 measured when the signal measured. Therefore, a fair condition can be obtained, and the noise value $\text{noise}_{unload}$ can be measured under this condition to obtain an accurate head SNR. During the adjusting process, the DFH power is gradually added until the real-time temperature sensor's resistance TSR2=TSR1. As a further proposition, it's a best case to self adjust the DFH power during unload case by close loop monitor.

Figure 5:
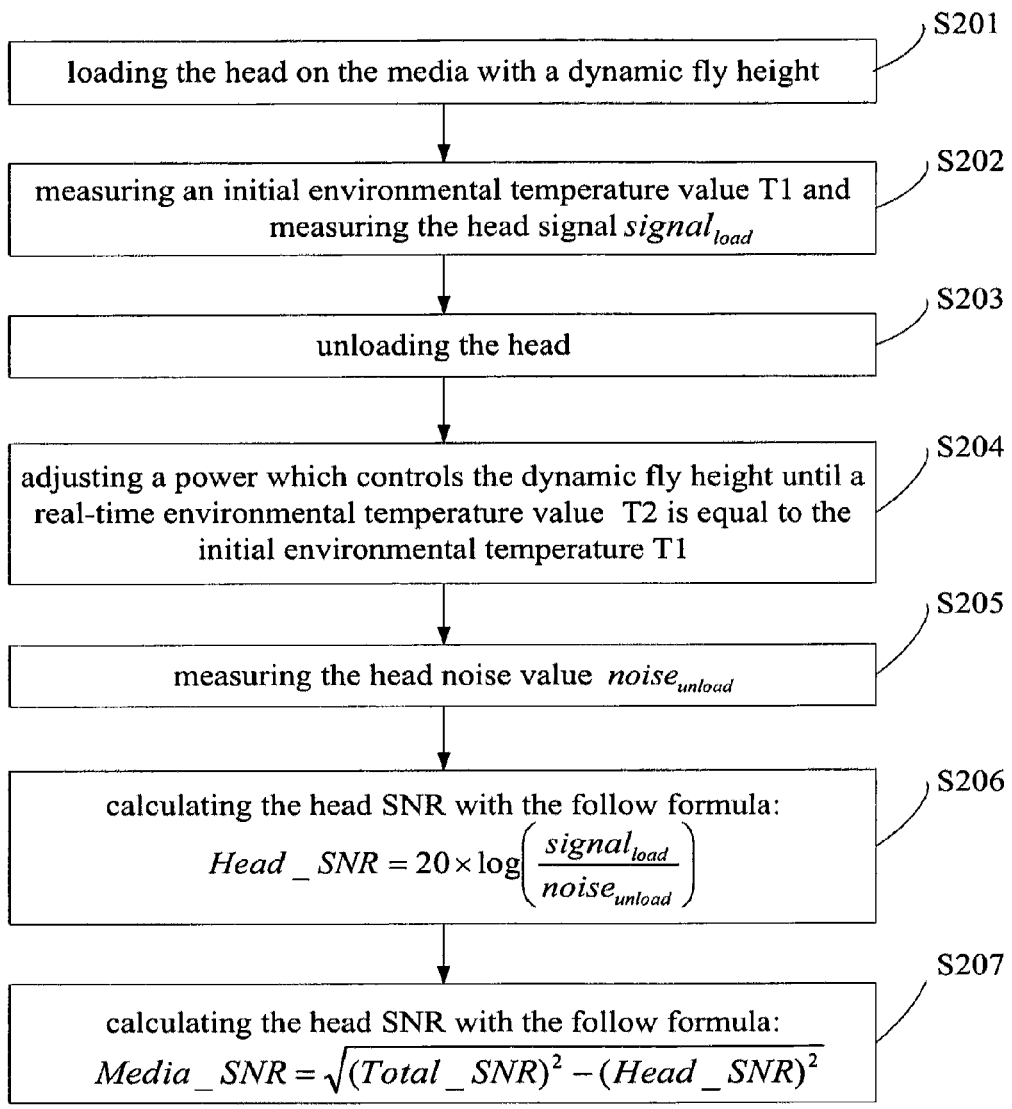
FIG. 5 is a flowchart showing a close loop method for measuring media head SNR according to an embodiment of the present invention.

After the head signal $\text{signal}_{load}$ and the noise value $\text{noise}_{unload}$ have been separately measured but with the same fair condition, the accurate head SNR can be calculated with the follow equation:

Similarly, a close loop method for improving media SNR measurement accuracy can be obtained in the same way. Referring to FIG. 5, a close loop method for measuring media SNR according to the present invention includes the following steps: loading the head on the media with a dynamic fly height (step S201); measuring an initial environmental temperature T1 and measuring the head signal $\text{signal}_{load}$ (step S202); unloading the head (step S203); adjusting a power which controls the dynamic fly height until a real-time environmental temperature T2 is equal to the initial environmental temperature T1 (step S204); measuring the head noise value $\text{noise}_{unload}$ (step S205); calculating the Head SNR with the follow equation (step S206):

$$\text{Head\_SNR} = 20 \times \log\left(\frac{\text{signal}_{load}}{\text{noise}_{unload}}\right);$$

calculating the Media SNR with the follow equation (step S207):

$$\text{Media\_SNR} = \sqrt{(\text{Total\_SNR})^2 - (\text{Head\_SNR})^2}$$

Concretely, the measurement and calculation of Head SNR is the same as mention above. For the total SNR measurement, the step (202) further comprises the step of measuring the noise value $\text{noise}_{load}$, that is, the signal and noise measurement for the total SNR are both under the head loading condition, after this, the total SNR is calculated with the follow equation:

$$\text{Total\_SNR} = 20 \times \log\left(\frac{\text{signal}_{load}}{\text{noise}_{load}}\right).$$

Thereafter, the media SNR can be obtain by calculating with the head SNR and head SNR value.

In comparison with the prior art, the present invention provides a close loop for measuring head SNR by making a fair condition for signal and the noise measurement. The head SNR is calculated through below equation:

$$\text{Head\_SNR} = 20 \times \log\left(\frac{\text{signal}_{load}}{\text{noise}_{unload}}\right),$$

here the signal measurement is under the condition that the head is loading on the media with a fly height, while the noise is measured by unload condition, both signal and noise measurement are under the condition that a DFH power is applied. However, the environmental temperature is much hotter during the head unload when the DFH power still applying, affecting the noise value $\text{noise}_{unload}$ become over-estimated. Therefore the present method tries to "control" the temperature during unload noise measurement that close to initial case. An initial environmental temperature T1 is measured for comparison when head signal $\text{signal}_{load}$ measured, then the DFH power is adjusting during unload case to affect the real-time environmental temperature until the correspond environmental temperature T2=T1, thereby the noise measurement can be carried out with fair condition, and a reliable and accurate head SNR can be obtained. Furthermore a reliable and accurate media SNR also can be obtained.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A close loop method for measuring head SNR, for a storage device comprising a storage media and a head, comprising steps of:
   (a) loading the head on the media with a dynamic fly height;
   (b) measuring an initial environmental temperature value T1 and measuring the head signal $signal_{load}$;
   (c) unloading the head;
   (d) adjusting a power which controls the dynamic fly height until a real-time environmental temperature value T2 is equal to the initial environmental temperature T1;
   (e) measuring the head noise value $noise_{unload}$;
   (f) calculating the head SNR with the follow equation:

$$Head\_SNR = 20 \times \log\left(\frac{signal_{load}}{noise_{unload}}\right).$$

2. The method as claimed in claim 1, wherein the environmental temperature is detected by a temperature sensor which is embedded into the head, and the environmental temperature is indicated by a temperature sensor resistance.

3. The method as claimed in claim 2, wherein the step (b) is measuring an initial temperature sensor's resistance value TSR1.

4. The method as claimed in claim 3, wherein the step (d) is adjusting the power which controls the dynamic fly height until the real-time temperature sensor's resistance value TSR2 is equal to the initial temperature sensor's resistance TSR1.

5. The method as claimed in claim 1, wherein the step (d) comprises the steps of:
   (d1) gradually adding the power which controls the dynamic fly height;
   (d2) measuring T2 under corresponding power;
   (d3) judging whether T2=T1, if NO, performing steps (d1)-(d2), if YES, going to step (e).

6. The method as claimed in claim 5, wherein the power for controlling the dynamic fly height is gradually adding from zero.

7. A close loop method for measuring media SNR, for a storage device comprising a storage media and a head, comprising steps of:
   (a) loading the head on the media with a dynamic fly height;
   (b) measuring an initial environmental temperature value T1 and measuring the head signal $signal_{load}$;
   (c) unloading the head;
   (d) adjusting a power which controls the dynamic fly height until a real-time environmental temperature value T2 is equal to the initial environmental temperature T1;
   (e) measuring the head noise value $noise_{unload}$;
   (f) calculating the head SNR with the follow equation:

$$Head\_SNR = 20 \times \log\left(\frac{signal_{load}}{noise_{unload}}\right);$$

(g) calculating the media SNR with the follow equation:

$$Media\_SNR = \sqrt{(Total\_SNR)^2 - (Head\_SNR)^2}.$$

8. The method as claimed in claim 7, wherein the step (b) further comprises the step of measuring the noise value $noise_{load}$.

9. The method as claimed in claim 8, wherein the total SNR is calculated with the follow equation:

$$Total\_SNR = 20 \times \log\left(\frac{signal_{load}}{noise_{load}}\right).$$

10. The method as claimed in claim 7, wherein the environmental temperature is detected by a temperature sensor which is embedded into the head, and the environmental temperature is indicated by a temperature sensor resistance.

11. The method as claimed in claim 10, wherein the step (b) is measuring an initial temperature sensor's resistance value TSR1.

12. The method as claimed in claim 11, wherein the step (d) is adjusting the power which controls the dynamic fly height until the real-time temperature sensor's resistance value TSR2 is equal to the initial temperature sensor's resistance TSR1.

13. The method as claimed in claim 7, wherein the step (d) comprises the steps of:
   (d1) gradually adding the power which controls the dynamic fly height;
   (d2) measuring T2 under corresponding power;
   (d3) judging whether T2=T1, if NO, performing steps (d1)-(d2), if YES, going to step (e).

14. The method as claimed in claim 13, wherein the power for controlling the dynamic fly height is gradually adding from zero.

* * * * *